(12) United States Patent
Braun et al.

(10) Patent No.: US 12,221,837 B2
(45) Date of Patent: Feb. 11, 2025

(54) CABLE SWIVEL

(71) Applicant: BAUER Maschinen GmbH, Schrobenhausen (DE)

(72) Inventors: Roland Arthur Braun, Aindling (DE); Tobias Siegmann, Pöttmes (DE)

(73) Assignee: BAUER Maschinen GmbH, Schrobenhausen (DE)

( * ) Notice: Subject to any disclaimer, the term of this patent is extended or adjusted under 35 U.S.C. 154(b) by 0 days.

(21) Appl. No.: 18/548,174

(22) PCT Filed: Mar. 7, 2022

(86) PCT No.: PCT/EP2022/055710
§ 371 (c)(1),
(2) Date: Aug. 28, 2023

(87) PCT Pub. No.: WO2022/194591
PCT Pub. Date: Sep. 22, 2022

(65) Prior Publication Data
US 2024/0141733 A1    May 2, 2024

(30) Foreign Application Priority Data
Mar. 18, 2021   (EP) ..................................... 21163391

(51) Int. Cl.
*E21B 17/03*   (2006.01)
*F16B 7/00*    (2006.01)

(52) U.S. Cl.
CPC ................ *E21B 17/03* (2013.01); *F16B 7/00* (2013.01)

(58) Field of Classification Search
CPC ........ E21B 17/023; E21B 17/03; E21B 17/04; E21B 17/046; E21B 17/05; E21B 7/20;
(Continued)

(56) References Cited

U.S. PATENT DOCUMENTS 4,137,974 A * 2/1979 Decker .................. E21B 44/02
173/147
5,501,287 A    3/1996 Loeser

FOREIGN PATENT DOCUMENTS

EP    2 821 585 B1    1/2016
EP    3 779 117 A1    2/2021

OTHER PUBLICATIONS

International Search Report issued in PCT/EP2022/055710; mailed Jun. 2, 2022.

(Continued)

*Primary Examiner* — Tara Schimpf
*Assistant Examiner* — Lamia Quaim
(74) *Attorney, Agent, or Firm* — Studebaker & Brackett PC

(57) ABSTRACT

The invention relates to a cable swivel for connecting a cable or a retainer to a component, in particular a Kelly bar, which is rotatable relative to the cable or the retainer, with a stationary first swivel part which can be fastened on the cable or the retainer, and a rotatable second swivel part which is supported in a rotatable and axially fixed manner on the stationary first swivel part and can be connected to the component. Furthermore, in the case of the invention provision is made in that the rotatable second swivel part is of sleeve-shaped design with an axial passage and in that on the stationary first swivel part a connecting pin is designed which at least partially extends axially along the passage of the rotatable second swivel part.

11 Claims, 4 Drawing Sheets

Figure 1:
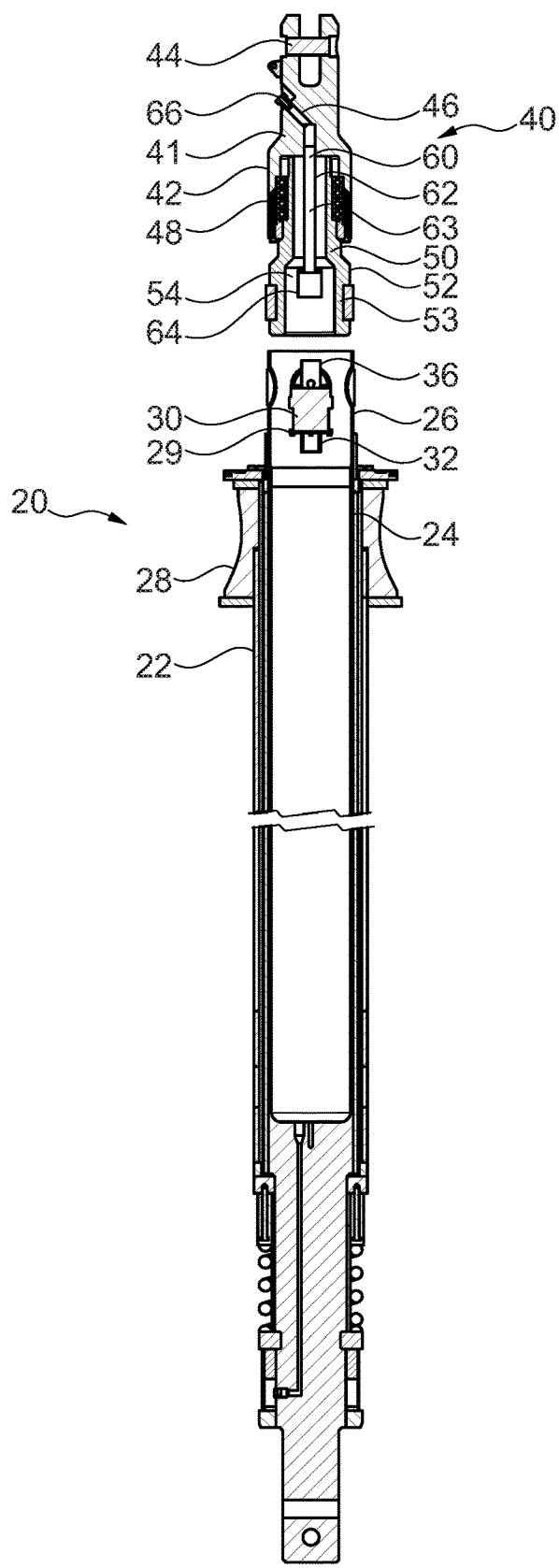

(58) Field of Classification Search
CPC . E21B 7/205; E21B 7/021; E21B 3/04; E02D 5/22
See application file for complete search history.

(56) References Cited

OTHER PUBLICATIONS

International Preliminary Report on Patentability and Written Opinion issued in PCT/EP2022/055710; issued Sep. 12, 2023.

\* cited by examiner

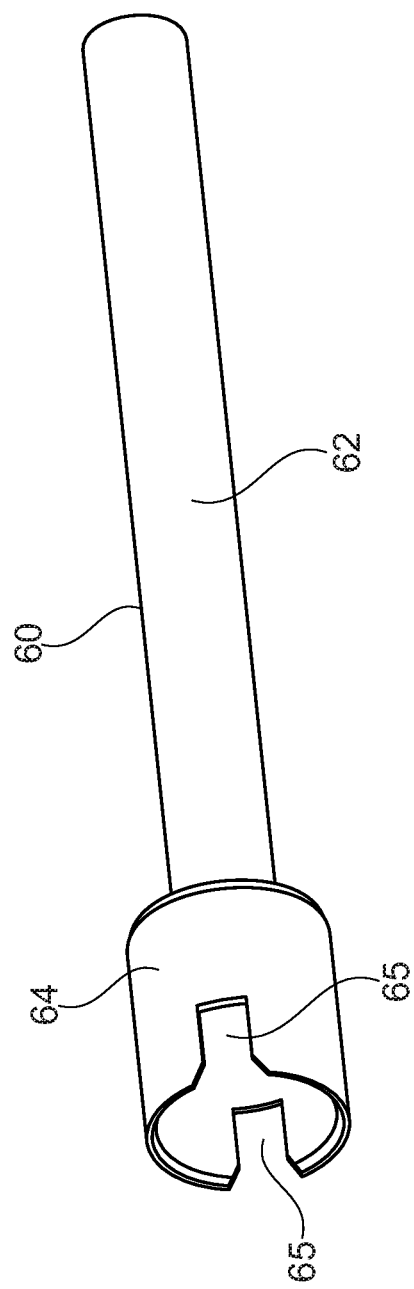
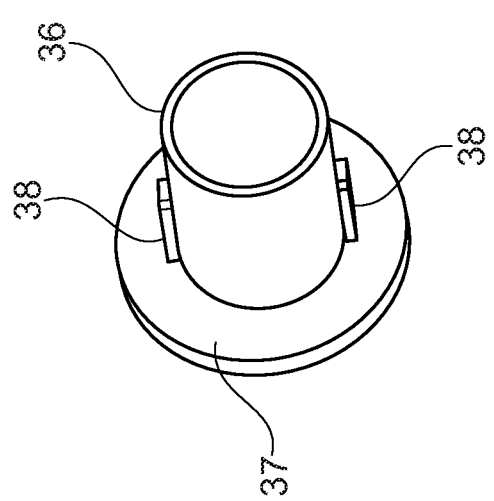
Fig. 3
Fig. 4

CABLE SWIVEL

The invention relates to a cable swivel for connecting a cable or a retainer to a component, in particular a Kelly bar, which is rotatable relative to the cable or the retainer, with a stationary first swivel part which can be fastened on the cable or the retainer, and a rotatable second swivel part which is supported in a rotatable and axially fixed manner on the stationary first swivel part and can be connected to the component, in accordance with the preamble of claim 1.

So-called cable swivels are especially used on construction machines if a rotationally driven component is to be suspended on a support cable or a support bar, in which case the rotation of the component should not be transmitted to the cable or the support bar.

A cable swivel is known from EP 2 821 585 B1 for example, with a torque support being provided in addition to the rotatable suspension on a cable. This torque support connects the support cable, which is substantially designed in a rotationally fixed manner, over and beyond the cable swivel to the stator of a rotary feedthrough on a rotationally drivable Kelly bar for a drilling tool. The additional arrangement of a rotary feedthrough in the region of the cable swivel thus allows the transmission of a liquid from the stationary support cable to the rotating drill rod. In this known cable swivel it is necessary to install the bar-shaped torque support manually after the Kelly bar has been suspended on the cable swivel. This is time-consuming.

Furthermore, a Kelly bar is known, in which a rotary feedthrough is arranged below a cable suspension. In this arrangement a force flow around the rotary feedthrough is achieved so that this can be operated in a particularly gentle way and therefore with little maintenance.

The invention is based on the object to provide a cable swivel, with which, in addition to a rotatable suspension of a component, an additional rotationally fixed connection can be created at the same time.

The object is achieved by a cable swivel having the features of claim 1. Preferred embodiments of the invention are stated in the dependent claims.

The cable swivel according to the invention is characterized in that the rotatable second swivel part is of sleeve-shaped design with an axial passage and in that on the stationary first swivel part or the rotatable component a connecting pin is designed which at least partially extends axially along the passage of the rotatable second swivel part.

A basic idea of the invention resides in the fact that a cable swivel is designed with a sleeve-shaped rotatable swivel part which is connected in a rotationally fixed manner to the rotatable component to be suspended. The second rotatable swivel part is rotatably supported on the stationary first swivel part that is connected to the cable or the stationary retainer, as for example a crane hook or a support bar. The sleeve-shaped design of the rotatable second swivel part renders it possible that in the passage formed thereby a connecting pin is arranged which is firmly connected to the stationary first swivel part or can be connected thereto in a rotationally fixed manner. The connecting pin can either be firmly arranged on the first swivel part or on the component to be suspended that can have a rotary feedthrough.

The invention makes it possible that alongside the actual rotatable suspension of a component on a cable swivel a rotationally fixed connection to a partial component as for example a rotary feedthrough, without the screwing of lines where possible, is simultaneously provided on the component to be suspended.

A preferred embodiment of the invention resides in the fact that the connecting pin is of tubular design and running along its tube interior is a fluid line, a data line, an electric power line and/or a hydraulic line. In this way, the cable swivel can not only be used as a simple joint element for suspension. In fact, the tubular connecting pin enables a liquid, a gas, electric power, data and/or another medium to be transmitted directly through the cable swivel.

According to a further development of the invention it is especially advantageous that at the free end of the connecting pin a connecting section is designed to form a form- and/or force-locking connection to a counter connecting section. The counter connecting section can be provided in a matching way on the component to be attached. The connecting section can in particular be a plug which, through simple axial plugging-together, establishes a desired connection to the counter connecting section. The connection can be a purely mechanical and/or a line-based connection.

According to a further development of the invention it is particularly advantageous that the connecting section can be connected to a stator of a rotary feedthrough. The rotary feedthrough can be provided on the component to be attached. Hence, the stator to be attached is connected in a rotationally fixed manner to the first swivel part of the cable swivel. By preference, the cable swivel can be suspended on a cable that is substantially torsion-proof.

According to a further embodiment of the invention it is particularly expedient that at its end facing away from the passage the connecting pin has a connector for a feed line. The connector can in particular be designed on an external side of the first swivel part. On the first swivel part which is stationary with respect to the rotationally drivable component a fluid, electric power or data line can thus be connected corresponding to the support cable or the support bar. As a result, an especially efficient transmission of a fluid, of electric power or data is possible.

The invention furthermore comprises a Kelly bar arrangement with such a cable swivel according to the invention and a Kelly bar which is provided at its upper end with the cable swivel for suspension on a support cable and at its lower end with a connecting means for a tool, in particular a drilling tool. The Kelly bar can be a single Kelly bar or a telescopic Kelly bar. On the external side of the rotatably suspended Kelly bar axially running drive strips are arranged in a generally known manner which enable a torque transmission from an annular Kelly drive to the Kelly bar which is axially slidable with respect thereto.

A preferred embodiment of the Kelly bar arrangement according to the invention resides in the fact that the Kelly bar is connected in a rotationally fixed manner to the rotatable second swivel part. Thus, the second swivel part co-rotates with the Kelly bar if this is rotationally driven. The axial force flow of the cable swivel runs from the support cable via the first swivel part, which is stationary with respect thereto, to the second swivel part which is rotatably supported on the said first swivel part and connected in a rotationally fixed manner to a suspension means of the Kelly bar.

According to a further development of the invention an especially advantageous Kelly bar arrangement results from the fact that at its upper end the Kelly bar has a rotary feedthrough which comprises a stator and a rotor that is connected in a rotationally fixed and axially fixed manner to the Kelly bar, and that the stator of the rotary feedthrough is connected in a rotationally fixed and releasable manner to the connecting pin of the cable swivel. The connecting pin of the cable swivel can thus have a feeding for a fluid, electric power or data from a feed line fed in from the outside which preferably runs at least partially in parallel to the support cable. The term stator refers in this case to the stationary part of the rotary feedthrough relative to the connecting pin and the first swivel part of the cable swivel. Within the meaning of the invention the rotor of the rotary feedthrough, in turn, is the part of the rotary feedthrough which is connected in a rotationally fixed manner to the rotationally drivable Kelly bar.

To easily form a line connection it is advantageous according to an embodiment of the invention that on the stator a counter connecting section is arranged which is designed to match the connecting section on the connecting pin. The line connection can in particular be formed by simple axial plugging-together according to a plug connection. An additional positional securing, for instance a screwing or bolting, can be dispensed with.

It is particularly expedient that the line connection is designed as a releasable form- and/or force-locking connection to convey a fluid, data and/or electric power. According to conventional axial plug connections matching force-locking elements, such as springs or clamping brackets, and/or form-locking elements, such as keyway elements, can be designed on the plug elements. To establish a rotationally fixed axial plug connection the plugs can also be designed in a non-circular shape, e.g. with a polygonal cross section or with an oval cross section. To convey a fluid corresponding ducts are provided, whereas for the purpose of conveying electric power or data corresponding lines are provided, e.g. with sliding contact connections.

The invention further comprises a drilling apparatus for drilling in the ground, with a carrier unit and a drill drive for rotationally driving a Kelly bar with a drilling tool, wherein a Kelly bar arrangement according to the invention is provided. The Kelly bar arrangement can be designed such as described previously. Thus, with the drilling apparatus the corresponding advantages can be achieved.

The drilling tool is arranged at the lower end of the Kelly bar. The drilling tool can in particular be an auger, a drilling bucket, a displacement drill, a rock drill or another drilling tool known for foundation engineering or special foundation engineering.

Figure 2:
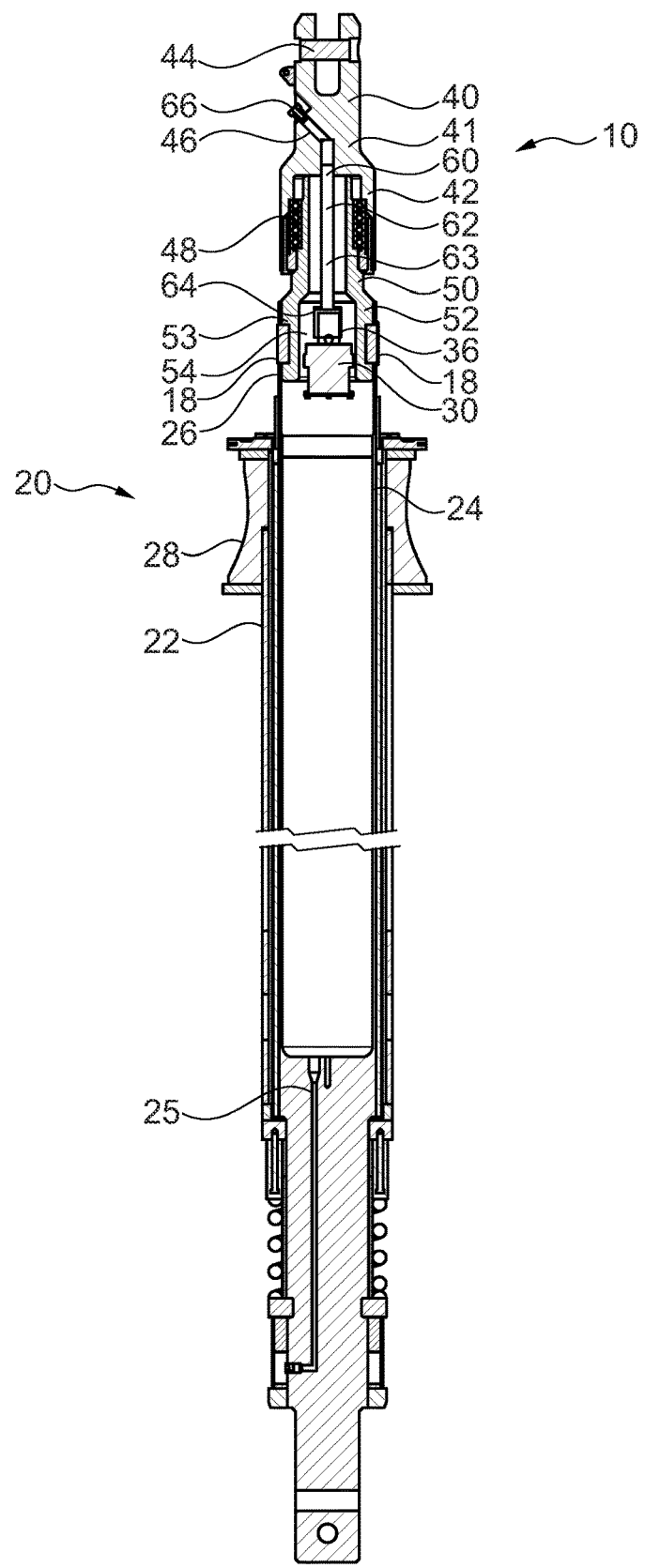
Figure 5:
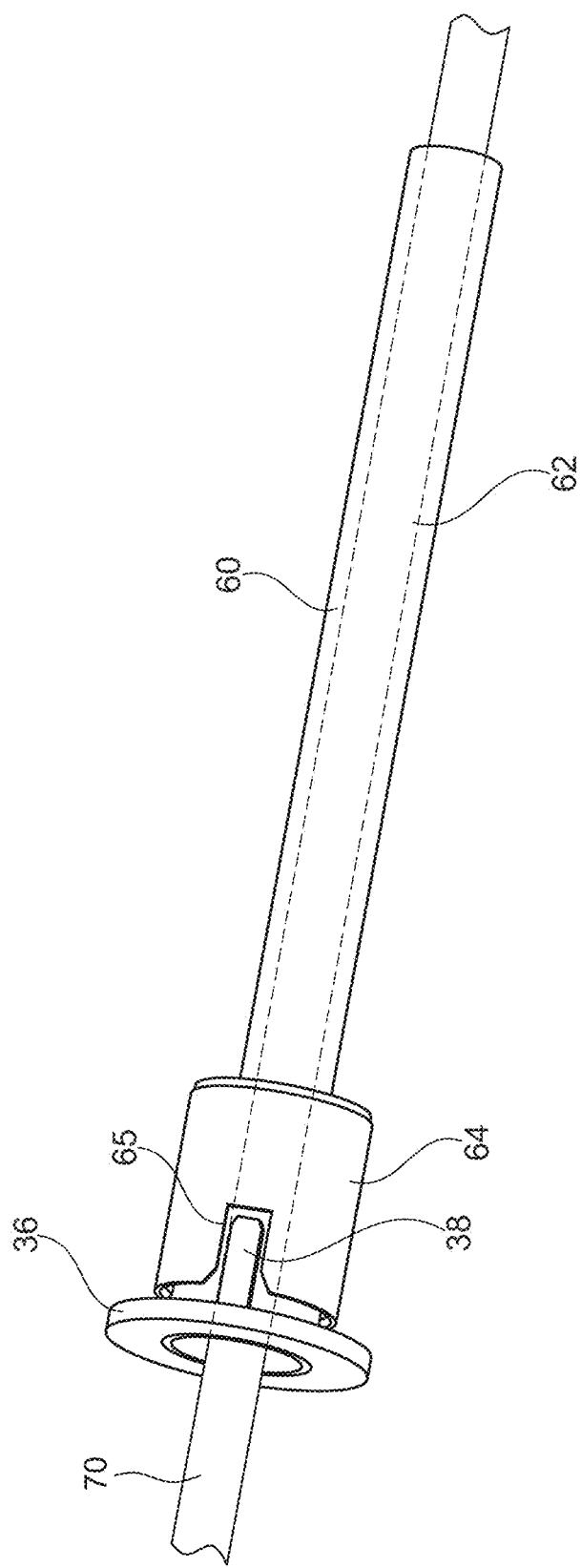

The invention is described further hereinafter by way of a preferred embodiment illustrated schematically in the drawings, wherein show:

FIG. 1 a cross sectional view of a Kelly bar arrangement according to the invention with a cable swivel according to the invention prior to plugging together;

FIG. 2 a cross sectional view of a Kelly bar arrangement according to the invention with a cable swivel according to the invention in a plugged-together state;

FIG. 3 a perspective detailed view of a connecting pin before being connected;

FIG. 4 a perspective detailed view of a counter connecting section for the connecting pin for connection; and FIG. 5 an illustration of the connecting pin of FIG. 2 after connection to the counter connecting section of FIG. 3.

A Kelly bar arrangement 10 with a Kelly bar 20 and a cable swivel 40 according to the invention is explained in greater detail in the following in conjunction with FIGS. 1 and 2. The Kelly bar 20 is designed as a telescopic Kelly bar 20 with a tubular outer Kelly bar 22 and a tubular inner Kelly bar 24 which is arranged therein in a rotationally fixed but axially displaceable manner relative to the outer Kelly bar 22. At the upper end of the inner Kelly bar 24, which protrudes from the outer Kelly bar 22, a tubular connecting region 26 for connection to a cable swivel 40 is arranged.

The cable swivel 40 is connected to a non-depicted support cable, via which the Kelly bar 20 is retained. Inside the tubular connecting region 26 a rotary feedthrough 30 is attached to a non-depicted support plate.

For instance when used on a drilling apparatus the Kelly bar 20 is retained via the cable swivel 40 in a vertical alignment on a mast via the support cable, with the Kelly bar 20 being driven in a rotating manner by an annular rotary drive to carry out a Kelly drilling method. By means of an adaptor ring 28 on the outer Kelly bar 22 the Kelly bar 20 can be placed onto the rotary drive. The cable swivel 40 prevents in a generally known manner the rotation of the rotationally driven Kelly bar 20 from being transmitted to the drilling apparatus support cable rotationally fixed with respect to the said Kelly bar.

The cable swivel 40 according to the invention has a tubular first swivel part 41 with a sleeve body 42. At its upper end facing away from the Kelly bar 20 this first swivel part 41 is fastened in a known manner by a transversely directed retaining bolt 44 on a suspension of the support cable. Inside the sleeve body 42 a rotary bearing 48 is arranged, by way of which a tubular second swivel part 50 is supported in a rotatable but axially fixed manner inside the first swivel part 41. The second swivel part 50 has a tubular outer sleeve 52 which protrudes axially with respect to the first swivel part 41 in the direction of the component to be attached, i.e. the Kelly bar 20 in the illustrated embodiment. The protruding connecting end 53 of the second swivel part 50 thus formed can be plugged in so as to fit into the sleeve-shaped connecting region 26 of the Kelly bar 20, as illustrated graphically in FIG. 1. In the plugged-together state, which is shown in FIG. 2, the connecting end 53 of the cable swivel 40 is connected in an axially fixed and rotationally fixed manner via transversely directed connecting elements 18 to the Kelly bar 20.

Inside the tubular second swivel part 50 a passage 54 is designed, into which a tubular connecting pin 60 projects centrally. The connecting pin 60 has a tube body 62 with a tube interior 63. As shown in FIG. 5, running along its tube interior 63 is a fluid line, a data line, an electric power line and/or a hydraulic line 70. The tube body 62 is connected in a rotationally fixed manner to the first swivel part 41 and leads into a feed duct 46 in the first swivel part 41. At the free end of the connecting pin 60 which leads into the wider-diameter connecting end 53 of the outer sleeve 52 a connecting section 64 is designed which has an enlarged diameter with respect to the tube body 62, as illustrated graphically in FIG. 2.

Matching the connecting section 64 on the connecting pin 60 provision is made on the rotary feedthrough 30 on the Kelly bar 20 for a counter connecting section 36 that is also arranged centrally and depicted in greater detail in FIG. 3. The counter connecting section 36 is connected in a rotationally fixed manner to a stator of the rotary feedthrough 30. The stator is rotatable with respect to a rotor 32 of the rotary feedthrough 30, while the rotor 32 is connected in a rotationally fixed and axially fixed manner via a support plate 29 to the inner Kelly bar 24.

When the Kelly bar 20 and the cable swivel 40 are plugged together axially the counter connecting section 36 is moved axially into the sleeve-shaped connecting section 64 of the connecting pin 60. In doing so, a line connection is established between the connecting pin 60 and the rotary feedthrough 30. By way of a connector 66 at the rear end of the feed duct 46 it is thus possible to establish a line connection via the rotary feedthrough 30 to a line duct 25 in the interior of the Kelly bar 20. In FIG. 1 a part of the line inside the inner Kelly bar 24 is not illustrated. Through this it is possible to transmit e.g. fluid, in particular hydraulic fluid, and/or, by providing corresponding electric power or data lines, also electric power or data from outside to the Kelly bar 20 that rotates during operation and has a drilling tool attached at the lower end.

The plugging-together of the connecting section 64 on the connecting pin 60 with the counter connecting section 36 on the rotary feedthrough 30 is illustrated again in greater detail in FIGS. 3 to 5. At the free end of the tube body 62 of the connecting pin 60 a larger-diameter sleeve-shaped connecting section 64 is designed. At the free front side of the connecting section 64 two groove-like recesses 65 are introduced in the axial direction in order to form a rotationally fixed connection. Matching this, on an external side of the sleeve-shaped counter connecting section 36 two tongue-shaped webs 38 are designed which can be moved axially into the recesses corresponding thereto, whereby a rotationally fixed form-locking connection is formed.

To fasten the sleeve-shaped counter connecting section 36 on the rotary feedthrough 30 a connecting flange 37 is provided.

The invention claimed is:

1. A swivel for connecting a cable or a retainer to a component, the component being rotatable relative to the cable or the retainer, with
    a stationary first swivel part which can be fastened on the cable or the retainer, and
    a rotatable second swivel part which is supported in a rotatable and axially fixed manner on the stationary first swivel part and can be connected to the component,
wherein
    the rotatable second swivel part is of sleeve-shaped design with an end portion proximal the stationary first swivel part, a connecting end portion proximal the component for connecting to the component, and an axial passage extending from the end portion to the connecting end portion, and
    a connecting pin is connected to the stationary first swivel part in a rotationally fixed manner, the connecting pin extending axially along the passage of the rotatable second swivel part from the end portion to the connecting end portion.

2. The swivel according to claim 1,
wherein
    the connecting pin is of tubular design and running along its tube interior is a fluid line, a data line, an electric power line and/or a hydraulic line.

3. The swivel according to claim 1,
wherein
    at a free end of the connecting pin a connecting section is designed to form a form- and/or force-locking connection to a counter connecting section.

4. The swivel according to claim 3, wherein the connecting section is configured to connect to a stator of a rotary feedthrough.

5. The swivel according to claim 1,
wherein
    at its end facing away from the passage and toward the component, the connecting pin has a connector for a feed line.

6. A kelly bar arrangement with
    a swivel and
    a Kelly bar which is provided at its upper end with the swivel for suspension on a support cable and at its lower end with a connecting means for a tool, wherein the swivel is designed according to claim 1.

7. The kelly bar arrangement according to claim 6,
wherein
    the Kelly bar is connected in a rotationally fixed manner to the rotatable second swivel part.

8. The kelly bar arrangement according to claim 6,
wherein
    at its upper end the Kelly bar has a rotary feedthrough, which comprises a stator and a rotor that is connected in a rotationally fixed and axially fixed manner to the Kelly bar, and
    the stator of the rotary feedthrough is connected in a rotationally fixed and releasable manner to the connecting pin of the swivel.

9. The kelly bar arrangement according to claim 8,
wherein
    to form a line connection a counter connecting section, which is designed to match the connecting section on the connecting pin, is arranged on the stator.

10. The kelly bar arrangement according to claim 9,
wherein
    the line connection is designed as a releasable form- and/or force-locking connection to convey a fluid, data and/or electric power.

11. A drilling apparatus for drilling in the ground, with a carrier unit and a drill drive for rotationally driving a Kelly bar with a drilling tool,
wherein
    a Kelly bar arrangement according to claim 6 is provided.

* * * * *